(12) United States Patent
Haley et al.

(10) Patent No.: US 7,794,155 B1
(45) Date of Patent: Sep. 14, 2010

(54) FIBER OPTIC CONNECTOR SYSTEM

(75) Inventors: Edmund J. Haley, Dillsburg, PA (US); David Robert Baechtle, Dillsburg, PA (US)

(73) Assignee: Tyco Electronics Corporation, Berwyn, PA (US)

(*) Notice: Subject to any disclaimer, the term of this patent is extended or adjusted under 35 U.S.C. 154(b) by 0 days.

(21) Appl. No.: 12/495,108

(22) Filed: Jun. 30, 2009

(51) Int. Cl.
*G02B 6/36* (2006.01)

(52) U.S. Cl. ............................. 385/78; 385/76; 385/77; 385/53; 385/56; 385/139

(58) Field of Classification Search .................. 385/53, 385/56, 58, 59, 60, 66, 62, 70, 71, 72, 76, 385/77, 88, 89, 90, 92, 94, 139, 78
See application file for complete search history.

(56) References Cited

U.S. PATENT DOCUMENTS

| | | | | |
|---|---|---|---|---|
| 5,073,046 A | * | 12/1991 | Edwards et al. | 385/90 |
| 5,386,487 A | * | 1/1995 | Briggs et al. | 385/59 |
| 6,318,903 B1 | * | 11/2001 | Andrews et al. | 385/77 |
| 6,682,230 B1 | * | 1/2004 | Demangone et al. | 385/88 |
| 7,325,980 B2 | | 2/2008 | Pepe | 385/86 |
| 7,338,214 B1 | | 3/2008 | Gurreri et al. | 385/55 |
| 2003/0077045 A1 | * | 4/2003 | Fleenor et al. | 385/78 |

* cited by examiner

*Primary Examiner*—Brian M Healy (57) ABSTRACT

A fiber optic connector assembly includes a connector housing, a connector base, and an optical fiber connector. The connector housing extends along a center axis from a mating end to a cable receiving end with a passage extending therebetween. The mating end is received in a mating connector that is mounted to a panel. The connector base is secured to the mating end of the connector housing and includes a channel extending therethrough. The channel receives an optical fiber. The optical fiber connector is coupled to the optical fiber and mates with the mating connector to optically couple the optical fiber with the mating connector. The optical fiber connector is slidably joined to the connector base to permit the optical fiber connector to axially move along the center axis relative to the connector housing when the connector housing mates with the mating connector.

20 Claims, 7 Drawing Sheets

FIBER OPTIC CONNECTOR SYSTEM

BACKGROUND OF THE INVENTION

The subject matter herein relates generally to electrical connectors and, more particularly, to connectors that optically communicate signals using optical fibers.

Some known optical connectors include optical fibers that are provided in a plug connector. The optical fibers extend to mating ends that are held by a plug end of the plug connector. The plug connector mates with a receptacle connector to permit optical communication of signals therebetween using the optical, fibers. The receptacle connector may include a transceiver that mates with the ends of the optical fibers to permit the plug connector and receptacle connector to communicate with one another.

The plug connectors may include, coupling components, such as threaded nuts, bayonet-style connectors, or push/pull connectors, that engage the receptacle connectors to secure the plug and receptacle connectors with one another. The engagement between the plug connector and the receptacle connector advances the ends of the optical fibers in the plug connector through an opening along an upper end of the receptacle connector and into the receptacle connector toward the transceiver. The plug connector may advance the ends of the optical fibers a fixed distance. In some connectors, the engagement between the plug and receptacle connectors mates the optical fibers with the transceiver by abutting the ends of the fiber optic cables against the transceiver. But, due to variances in the manufacture or assembly of the receptacle connectors and/or devices, the location of the transceiver in the receptacle connector may vary.

If the transceiver is located too far toward the upper end of the receptacle connector, the engagement between the plug connector and the receptacle connector may advance the ends of the optical fibers too far. For example, the ends of the optical fibers may be overdriven and forced up against the transceiver by an amount sufficient to damage the ends of the optical fibers. While some known receptacle connectors have some tolerance to account for variability of the location of the transceiver relative to the receptacle connector, the tolerance in known connectors may be too small to avoid overdriving the optical fibers. The overdriving of and damage to the optical fibers may impact the integrity of the signals communicated between the plug and receptacle connectors.

Thus, a need exists for optical fiber connectors that provide increased tolerances in the mating of the connectors to avoid damaging the fiber optic cables in the connectors.

BRIEF DESCRIPTION OF THE INVENTION

In one embodiment, a fiber optic connector assembly is provided. The assembly includes a connector housing, a connector base, and an optical fiber connector. The connector housing extends along a center axis from a mating end to a cable receiving end with a passage extending between the mating end and the cable receiving end. The mating end is configured to mate with a mating connector. The connector base is secured to the mating end of the connector housing and includes at least one channel extending therethrough. The channel is configured to receive an optical fiber. The optical fiber connector is coupled to the optical fiber and is configured to mate with the mating connector to optically couple the optical fiber with the mating connector. The optical fiber connector is slidably joined to the connector base to permit the optical fiber connector to axially move along the center axis relative to the connector housing when the connector housing, mates with the mating connector.

In another embodiment, another fiber optic connector assembly is provided. The connector assembly includes a connector housing, a connector base, an optical fiber connector and a coupling interface component. The connector housing extends along a center axis from a mating end to a cable receiving end with a passage extending therebetween. The mating end is configured to be received in a mating connector. The connector base is coupled with the mating end of the connector housing and includes at least one channel extending therethrough for receiving an optical fiber. The optical fiber connector is joined with the optical fiber and is configured to mate with the mating connector to optically join the optical fiber with the mating connector. The coupling interface component is disposed around the connector housing and is configured to engage the mating connector to secure the connector housing and the mating connector together. The coupling interface component moves the optical fiber connector toward the mating connector and the optical fiber connector axially floats along the center axis relative to the connector housing when the coupling interface component engages the mating connector.

DETAILED DESCRIPTION OF THE INVENTION

Figure 1:
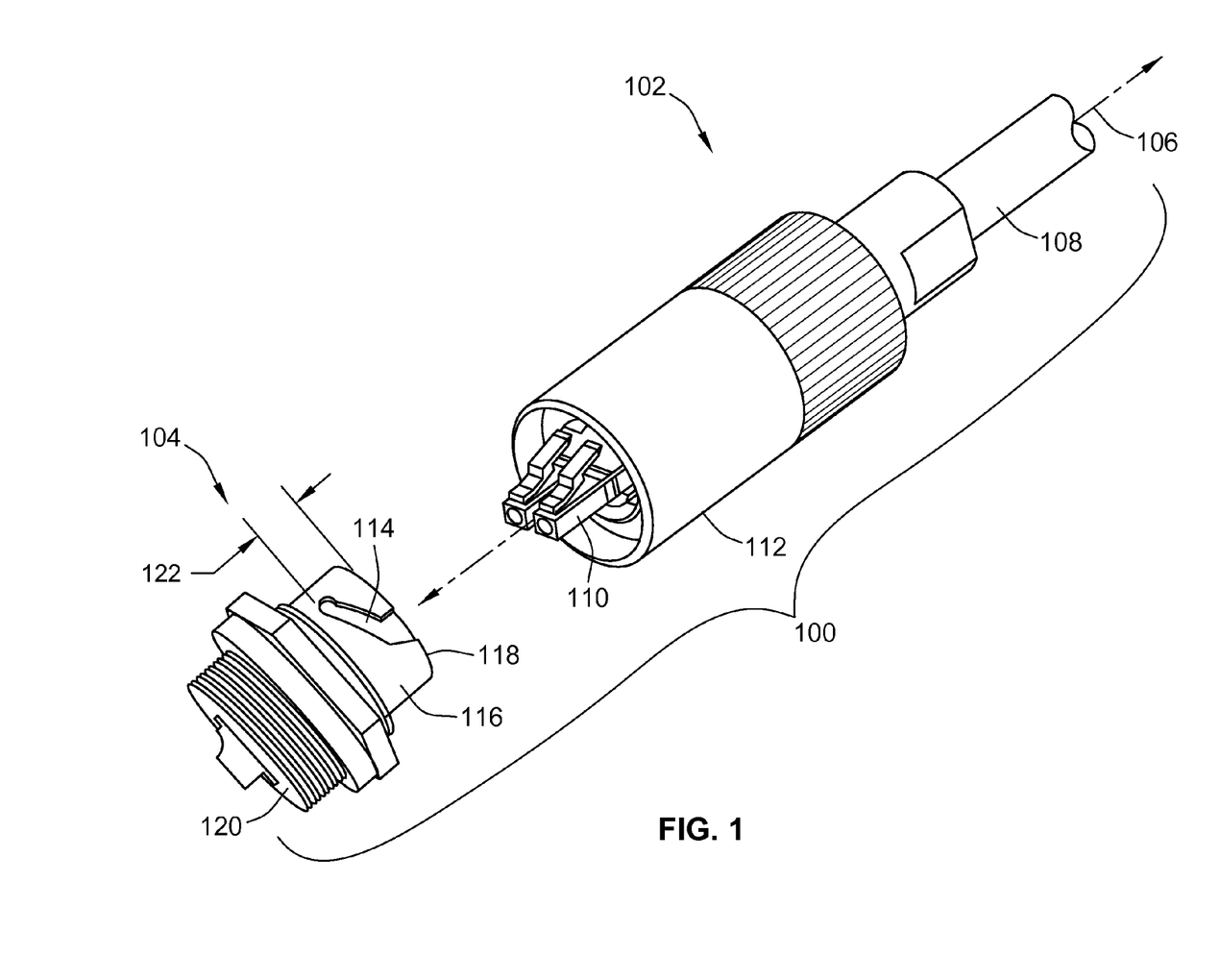
FIG. 1 is a perspective view of a fiber optic connector system in accordance with one embodiment.

FIG. 1 is a perspective view of a fiber optic connector system 100 in accordance with one embodiment. The connector system 100 includes a fiber optic connector assembly 102 and a mating, connector assembly 104. In the illustrated embodiment, the connector assemblies 102, 104 are small form factor LC connectors. The scope of the disclosed embodiments is not, however, limited to LC connectors. One or more embodiments may encompass connectors other than LC connectors and the illustration and description herein of LC connectors should not be construed as a limitation on the scope of all embodiments. Additionally, while the fiber optic connector assembly 102 is shown and described in terms of a plug connector and the mating connector assembly 104 is shown and described in terms of a receptacle connector, alternatively the fiber optic connector assembly 102 may be a receptacle connector that receives the mating connector assembly 104.

The fiber optic connector assembly 102 is elongated and oriented along a center axis 106. The fiber optic connector assembly 102 includes a cable 108 that houses one or more elongated optical fibers 200 (shown in FIG. 2). The cable 108 and optical fibers optical fibers 200 extend along the center axis 106. While the center axis 106 is shown as a generally straight line in FIG. 1, the center axis 106 may include one or more bends, undulations and other variances from a straight line. The optical fibers optical fibers 200 are coupled with one or more optical fiber connectors 110. In the illustrated embodiment, the fiber optic connector assembly 102 includes two optical fiber connectors 110, although a different number, shape, and/or arrangement of optical fiber connectors 110 may be provided. The optical fiber connectors 110 may be received in the mating connector assembly 104 to optically couple the connector assemblies 102, 104. The optical fiber connectors 110 include outer ends 202 (shown in FIG. 2) of the optical fibers 200. The optical fiber connectors 110 are received in the mating connector assembly 104 to place the outer ends 202 of the optical fibers 200 in a mated relationship with an optical communication device 500 (shown in FIG. 5), such a transceiver or another optical connector, that is disposed in the mating connector assembly 104. For example, the optical fiber connectors 110 may directly abut the outer ends 202 of the optical fibers 200 against a mating surface 508 (shown in FIG. 5) of the optical communication device 500. Signals may be optically communicated between the optical fibers 200 and the mating connector assembly 104 once the outer ends 202 of the optical fibers 200 are engaged with the optical communication device 500.

The fiber optic connector assembly 102 includes a coupling interface component 112 that extends around the center axis 106 along a portion of the length of the fiber optic connector assembly 102. The coupling, interface component 112 engages the mating connector assembly 104 to secure the fiber optic connector assembly 102 and the mating connector assembly 104 together in a mated engagement or relationship. In the illustrated embodiment, the coupling interface component 112 is a bayonet-style coupling nut. For example, the coupling interface component 112 may include one or more inwardly extending protrusions (not shown) that engage recesses 114 of the mating connector assembly 104 to provide a bayonet-style connection between the connector assemblies 102, 104. Alternatively, the coupling interface component 112 may have an internal threaded surface that engages an external threaded surface of the mating connector assembly 104 to secure the connector assemblies 102, 104 together. In another embodiment, the coupling interface component 112 may include a push/pull connector that engages and disengages the mating connector assembly 104 by pushing and/or pulling the coupling interface component 112 in directions along the center axis 106. The engagement between the coupling interface component 112 and the mating connector assembly 104 may advance the optical fiber connectors 110 toward the optical communication device 500 (shown in FIG. 5) in the mating connector assembly 104 along the center axis 106 by a coupling distance 122. For example, the outer ends 202 (Shown in FIG. 2) of the optical fibers 200 (shown in FIG. 2) may be moved along the center axis 106 by the coupling distance 122.

Figure 5:
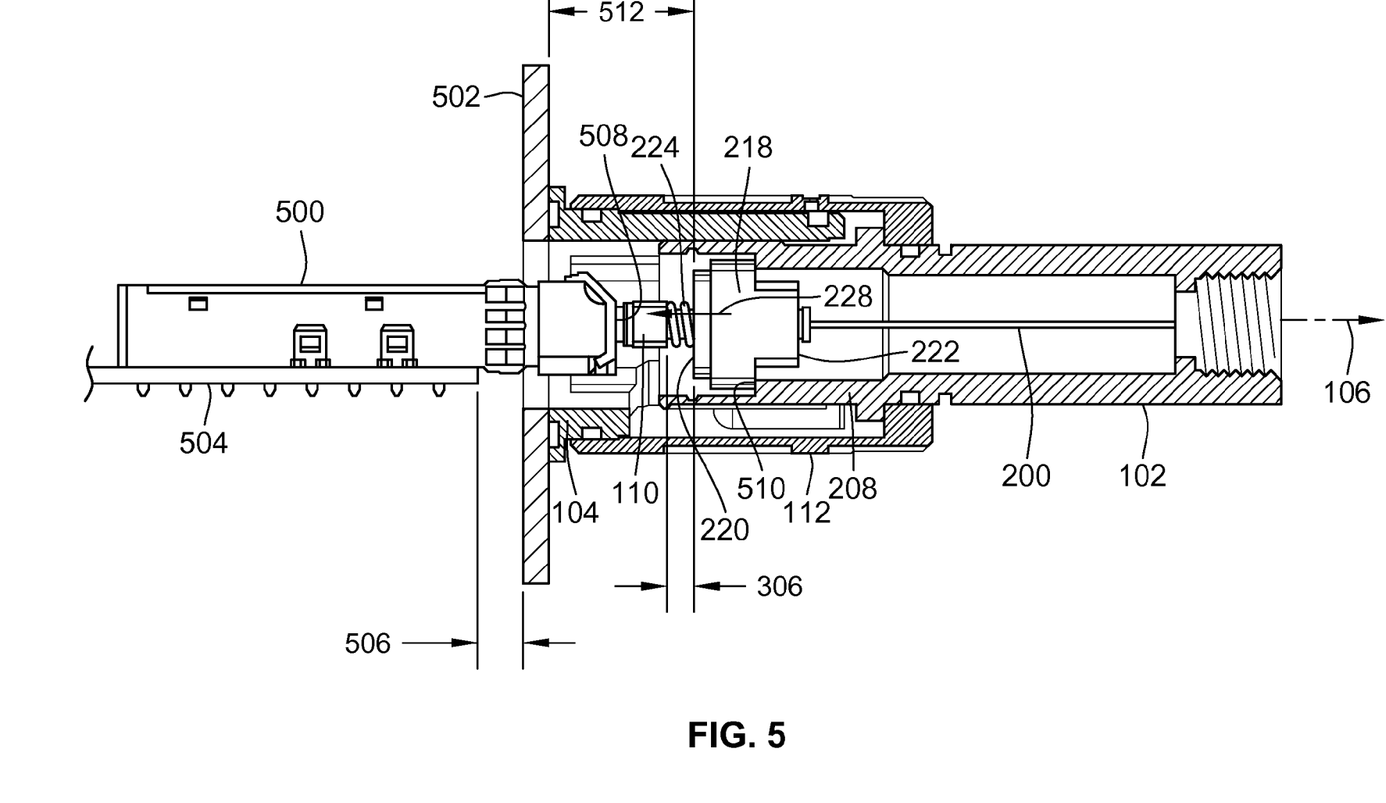
FIG. 5 is a partial cross-sectional view of the fiber optic connector assembly and a mating connector assembly shown in FIG. 1 in accordance with one embodiment.

The mating connector assembly 104 includes an outer housing 116 that partially encloses the optical communication device 500 (shown in FIG. 5). For example, the outer housing 116 may circumferentially surround a perimeter of the optical communication device 500 while providing access to the optical communication device 500 on one or more ends 118, 120 of the outer housing 116. In one embodiment, the mating connector assembly 104 may be mounted to a panel 502 (Shown in FIG. 5) or a substrate (not shown), such as a circuit board. For example, the mating connector assembly 104 may be joined to the panel 502 (shown in FIG. 5) that forms part of an exterior surface of a device (not shown) and protrude outside of the device to provide access to the end 118 of the mating connector assembly 104. The fiber optic connector assembly 102 may mate with the mating connector assembly 104 from outside of the device. Alternatively, the mating connector assembly 104 may be embodied in an optical connector assembly that mates with the fiber optic connector assembly 102.

As described below, the optical fiber connectors 110 float along the center axis 106 to mate the optical fiber connectors 110 with the optical communication device 500 (shown in FIG. 5) of the mating connector assembly 104. For example, the optical fiber connectors 110 may axially move along the center axis 106 relative to the mating surface 508 (shown in FIG. 5) of the optical communication device 500 when the fiber optic connector assembly 192 mates with the mating connector assembly 104. In one embodiment, the optical fiber connectors 110 may axially float in order to position the outer ends 202 (shown in FIG. 2) of the optical fibers 200 (shown in FIG. 2) in an abutted relationship against the mating surface 508 without leaving a significant air gap between the outer ends 202 and the mating surface 508 and without overdriving or compressing the optical fibers 200 against the mating surface 508 to the point at which the optical fibers 200 become damaged.

Figure 2:
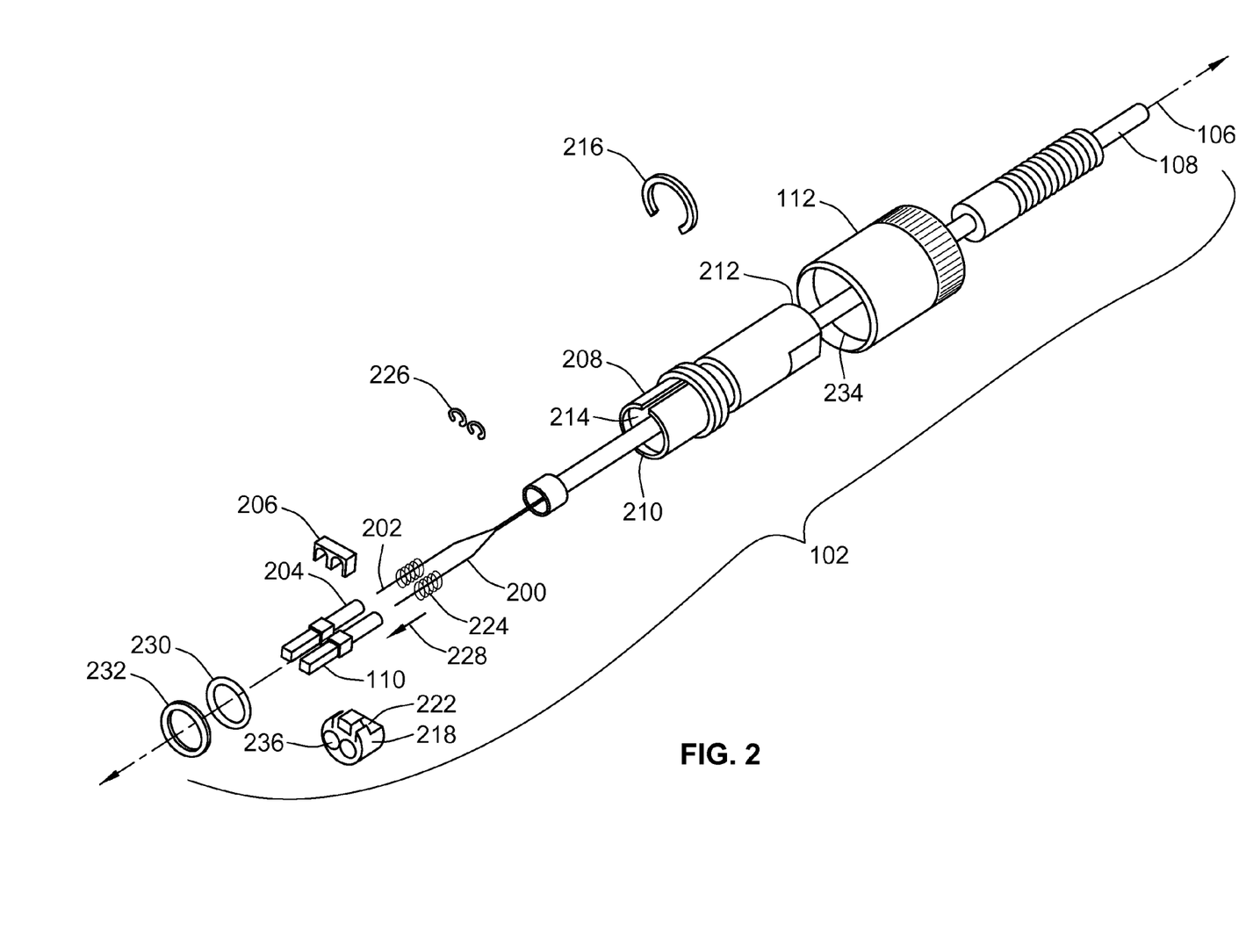
FIG. 2 is an exploded view of a fiber optic connector assembly shown in FIG. 1 in accordance with one embodiment.

FIG. 2 is an exploded view of the fiber optic connector assembly 102 in accordance with one embodiment. The optical fibers 200 extend through the cable 108 to the outer ends 202. Each of the outer ends 202 is disposed within a different optical fiber connector 110. Alternatively, more than one optical fiber 200 may extend to outer ends 202 located in a single optical fiber connector 110. The optical fiber connectors 110 include posts 204 that rearwardly extend from the optical fiber connectors 110 along the center axis 106. For example, the posts 204 may extend in directions that are approximately parallel to the center axis 106. The posts 204 may include a longitudinal passage (not shown) extending through the length of the posts 204. The optical fibers 200 may pass through the posts 204 to the optical fiber connectors 110. A duplex clip 206 is coupled to the optical fiber connectors 110 to secure the optical fiber connectors 110 together. For example, the duplex clip 206 may be snap fit onto the optical fiber connectors 110 or the posts 204 to maintain the optical fiber connectors 110 in predetermined positions with respect to one another.

The fiber optic connector assembly 102 includes a connector housing 208 that extends along the center axis 106 from a mating end 210 to a cable receiving end 212. The mating end 210 is received in the mating connector assembly 104 (shown in FIG. 1) when the fiber optic connector assembly 102 and mating connector assembly 104 mate with one another. The connector housing 208 includes a passage 214 that extends through the connector housing 208 between the mating end 210 and the cable receiving end 212. The cable 108 extends through the passage 214 from the cable receiving end 212 to the mating end 210. The connector housing 208 is at least partially disposed within the coupling interface component 112. For example, a forward portion of the connector housing 208 at the mating end 210 may extend forward of the coupling interface component 112 to permit an operator to insert the connector housing 208 into the mating connector assembly 104.

A retaining clip 216 may be joined to the connector housing 208. The retaining clip 216 may be engaged by the coupling interface component 112 when the coupling interface component 112 mates with the mating connector assembly 104. The coupling interface component 112 may compress the mating connector assembly 104 against the connector housing 208. For example, the coupling interface component 112 may force the connector housing 208 toward the mating connector assembly 104 by the distance 122 (shown in FIG. 1) along the center axis 106 when the coupling interface component 112 engages the mating connector assembly 104. The movement of the connector housing 208 toward the mating connector assembly 104 also may move the optical fiber connectors 110 toward the optical communication device 500 (shown in FIG. 5) located in the mating connector assembly 104 by the coupling distance 122.

The fiber optic connector assembly 102 includes a connector base 218 that is coupled with the connector housing 208. The connector base 218 extends from a forward end 220 to a rearward end 222 along the center axis 106. In the illustrated embodiment, the connector base 218 includes two channels 236 that extend through the connector base 218 along the center axis 106 from the forward end 220 to the rearward end 222. For example, the channels 236 may be disposed approximately parallel to the center axis 106. Alternatively, a different number of channels 236 may be provided. The posts 204 of the optical fiber connectors 110 are received in the channels 236 to slidably join the optical fiber connectors 110 to the connector base 218. The posts 204 slide within the connector base 218 to permit the optical fiber connectors 110 to axially move along the center axis 106 relative to the connector base 218. Retaining clips 226 may be placed on the posts 204 to prevent the posts 204 from forwardly sliding out of the connector base 218. For example, the retaining clips 226 may engage the rearward end 222 of the connector base 218 to prevent the posts 204 from being removed from the connector bale 218 through the forward end 220 of the connector base 218.

The posts 204 may be disposed within corresponding springs 224 in the connector base 218. The posts 204 may be loaded into the springs 224 such that the springs 224 tortuously surround the exterior surfaces of the posts 204. The springs 224 extend between the optical fiber connectors 110 and the connector base 218. For example, the springs 224 may extend between the optical fiber connectors 110 and an internal ledge 400 (shown in FIG. 4) of the connector base 218. The springs 224 may impart a restoring force on the optical fiber connectors 110 along the center axis 106 in a mating direction 228 when the optical fiber connectors 110 engage the optical communication device 500 (shown in FIG. 5) of the mating connector assembly 104 (shown in FIG. 1). For example, if the engagement between the fiber optic connector assembly 102 and the mating connector assembly 104 overdrives the outer ends 202 of the optical fibers 200 toward the optical communication device 500, the springs 224 may be compressed between the optical fiber connectors 110 and the connector base 218 and the posts 204 may slide within the connector base 218 to permit the optical fiber connectors 110 to retreat away from the optical communication device 500. The springs 224 impart the restoring force on the optical fiber connectors 110 in the mating direction 228 to maintain engagement between the outer ends 202 of the optical fibers 200 and the optical communication device 500.

In one embodiment, the optical fiber connectors 110 may include internal springs (not shown) that are coupled with the optical fibers 200 within the optical fiber connectors 110. The internal springs may provide a partial restoring force, in a manner similar to the springs 224. For example, the internal springs may impart a restoring force in the mating direction 228 when the ends 202 of the optical fibers 200 are compressed against the optical communication device 500. The restoring force provided by the internal springs is less than the restoring force provided by the springs 224 in one embodiment. For example, the internal springs may have lower spring constants than the springs 224 and may fully compress before the springs 224 compress. Alternatively, the internal springs may have a greater spring constant than the springs 224. In another embodiment, the spring constants of the internal springs and the springs 224 are approximately the same.

A washer 230 may be placed on a forward perimeter of the forward end 220 of the connector base 218. After the connector base 218 is loaded into the connector housing 208, a retaining ring 232 may be placed in the connector housing 208. For example, the retaining ring 232 may be disposed along an inner groove 234 of the connector housing 208. The retaining ring 232 engages the washer 230 to secure the connector base 218 within the connector housing 208. For example, the retaining ring 232 may decrease the effective inside diameter of the connector housing 208 and engage the washer 230 or the connector base 218 to prevent the connector base 218 from being removed from the connector housing 208 through the mating end 210 of the connector housing 208.

Figure 3:
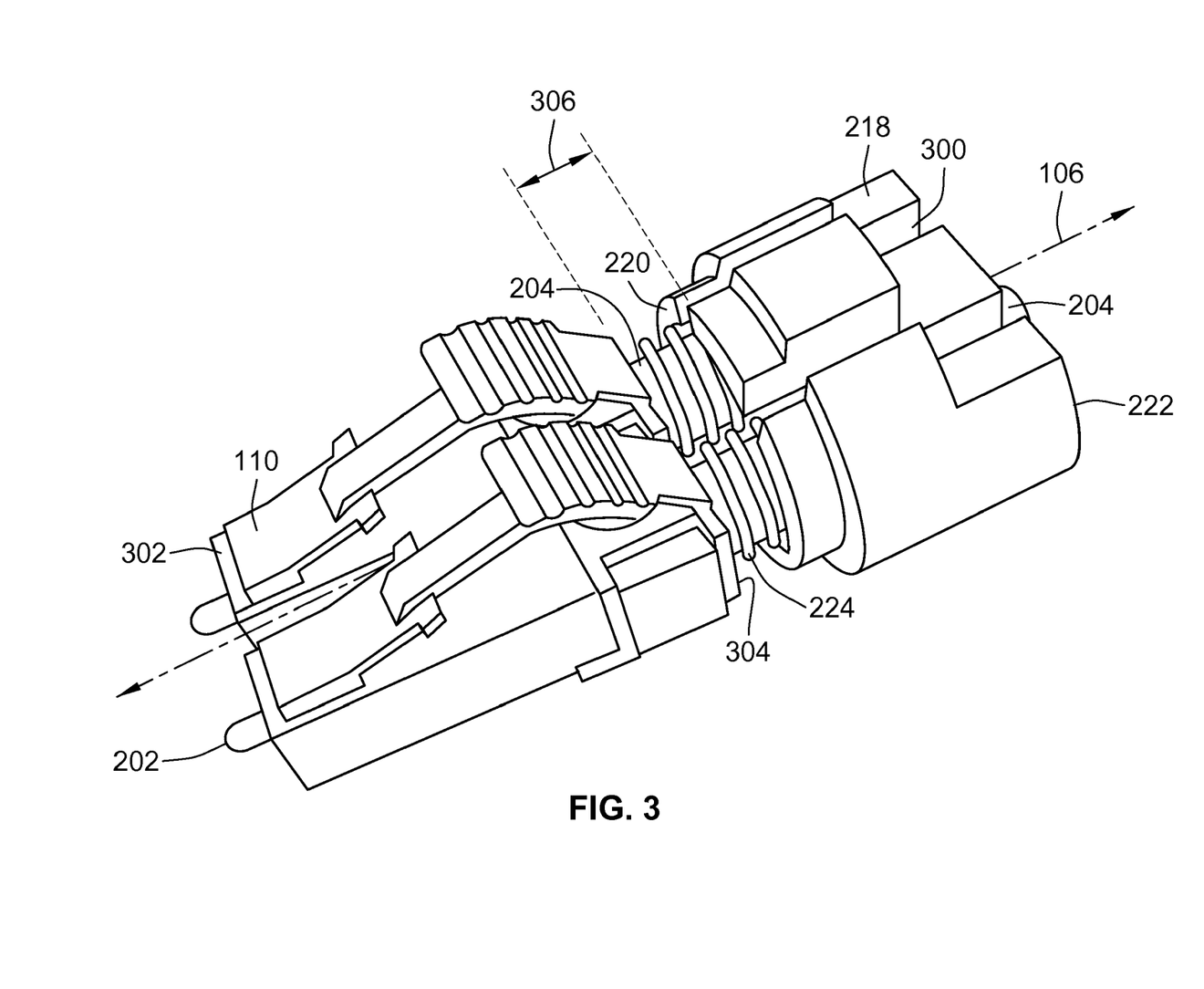
FIG. 3 is a perspective view of the connector base shown in FIG. 2 in accordance with one embodiment.

FIG. 3 is a perspective view of the connector base 218 in accordance with one embodiment. As shown in FIG. 3, both the posts 204 and the springs 224 are disposed in the channels 236 of the connector base 218. The connector base 218 may include slots 300 that extend from the forward end 220 to the rearward end 222. The slots 300 provide access to the channels 236 (shown in FIG. 2) from the exterior surface of the connector base 218. For example, the slots 300 may be openings into the channels 236 through which the optical fibers 200 (shown in FIG. 2) may be individually loaded. The optical fibers 200 may be laid down into the channels 236 through the slots 300 prior to inserting the optical fibers 200 through the posts 204 and into the optical fiber connectors 110.

The optical fiber connectors 110 have a mating end 302 and an opposite rearward end 304. The mating end 302 may engage the mating surface 508 (shown in FIG. 5) of the optical communication device 500 (shown in FIG. 5) to couple the outer ends 202 of the optical fibers 200 (shown in FIG. 2) with the optical communication device 500. The rearward ends 304 of the optical fiber connectors 110 are separated from the forward end 220 of the connector base 218 by a floating distance 306. The floating distance 306 represents the distance along the center axis 106 that the optical fiber connectors 110 may axially move along the center axis 106 relative to one or more other components of the fiber optic connector assembly 102 (shown in FIG. 1). For example, the floating distance 306 may be the distance that the optical fiber connectors 110 may be moved toward the connector base 218 and the distance that the springs 224 may be compressed. When the optical fiber connectors 110 mate with the optical communication device 500.

Figure 4:
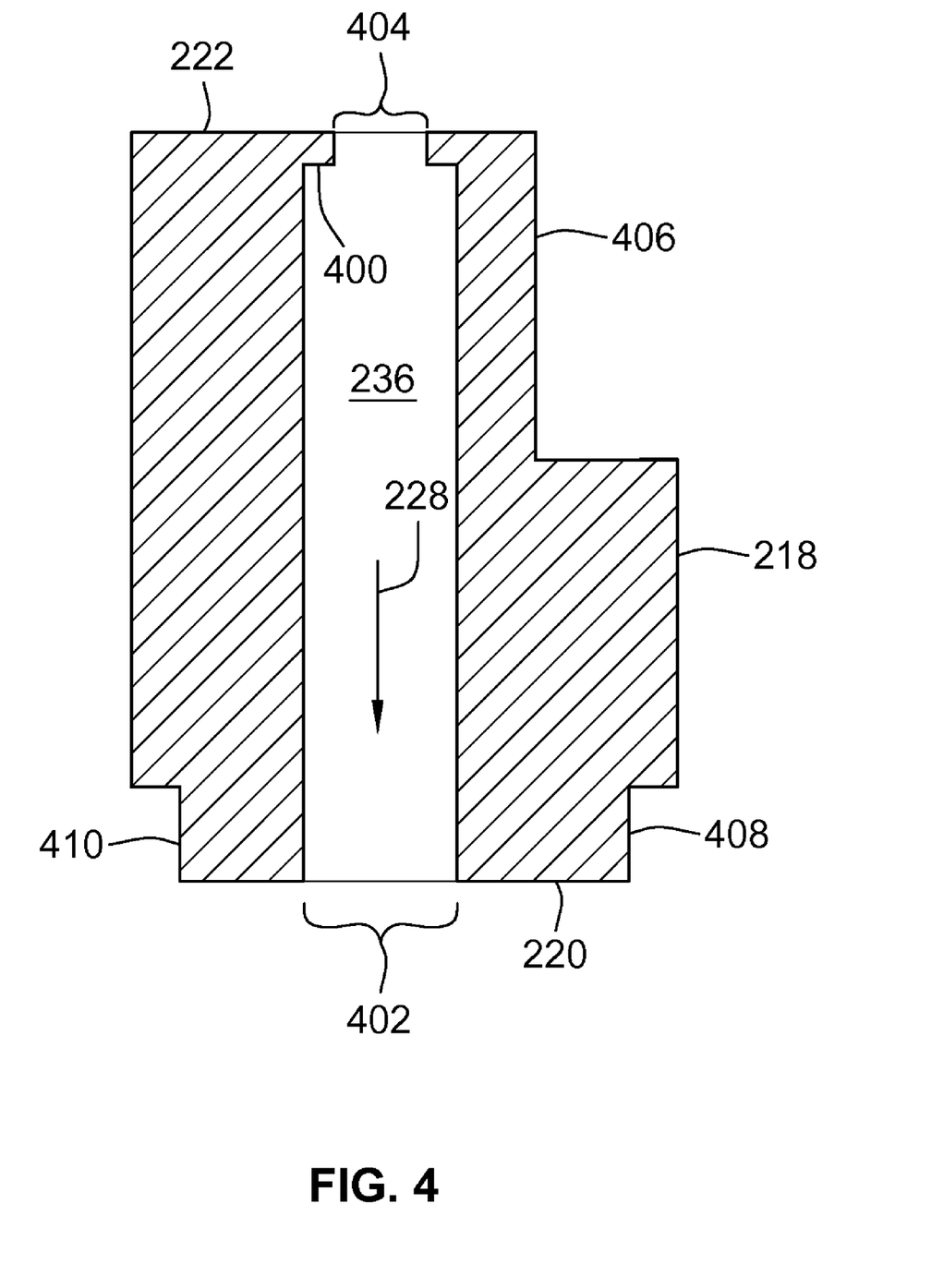
FIG. 4 is a cross-sectional view of the connector base in accordance with one embodiment.

FIG. 4 is a cross-sectional view of the connector base 218 in accordance with one embodiment. The connector base 218 includes internal ledges 400 that extend into the channels 236. Each channel 236 may include the ledges 400. The ledges 400 reduce the inside diameter of the channels 236. In one embodiment, the posts 204 (shown in FIG. 2) are sized to fit through the channels 236 and between the ledges 400. For example, the posts 204 may have a sufficiently small width or outside diameter that the posts 204 can move through an opening 402 of the channel 236 at the forward end 220 and through a smaller opening 404 of the channel 236 at the rearward end 222. Conversely, the springs 224 may be sized to fit into the channels 236 but not between the ledges 400. For example, the springs 224 may have a sufficient width or outside diameter that the springs 224 can be inserted into the opening 402 at the forward end 220 but not through the opening 404 at the rearward end 222. Instead, the springs 224 engage the ledges 400 and are prevented from exiting the channels 236 through the opening 404 by the ledges 400.

The springs 224 are compressed between the optical fiber connectors 110 (shown in FIG. 1) and the ledges 400 when the optical fiber connectors 110 are moved toward the connector base 218. As described above, the optical fiber connectors 110 may be pushed backward toward the connector base 218 when the fiber optic connector assembly 102 (shown in FIG. 1) mates with the mating connector assembly 104 (shown in FIG. 1). The springs 224 are compressed between the ledges 400 and the optical fiber connectors 110 and provide a restoring force along the mating direction 228. The restoring force may ensure that the optical fiber connectors 110 remain in contact with or otherwise mated with the optical communication device 500 (shown in FIG. 5).

in the illustrated embodiment, the connector base 218 includes several flat surfaces 406, 408, 410 along, the exterior surface of the connector base 218. For example, the connector base 218 may have an approximately cylindrical shape with one or more flat, surfaces 406-410 cut into the connector base 218. The flat surfaces 406-410 may engage the connector housing 208 (shown in FIG. 2) to prevent the connector base 218 from rotating relative to the connector housing 208. For example, a corresponding flat surface or ledge (not shown) of the connector housing 208 may engage one or more of the flat-surfaces 406-410 to prevent the connector base 218 from rotating.

Figure 6:
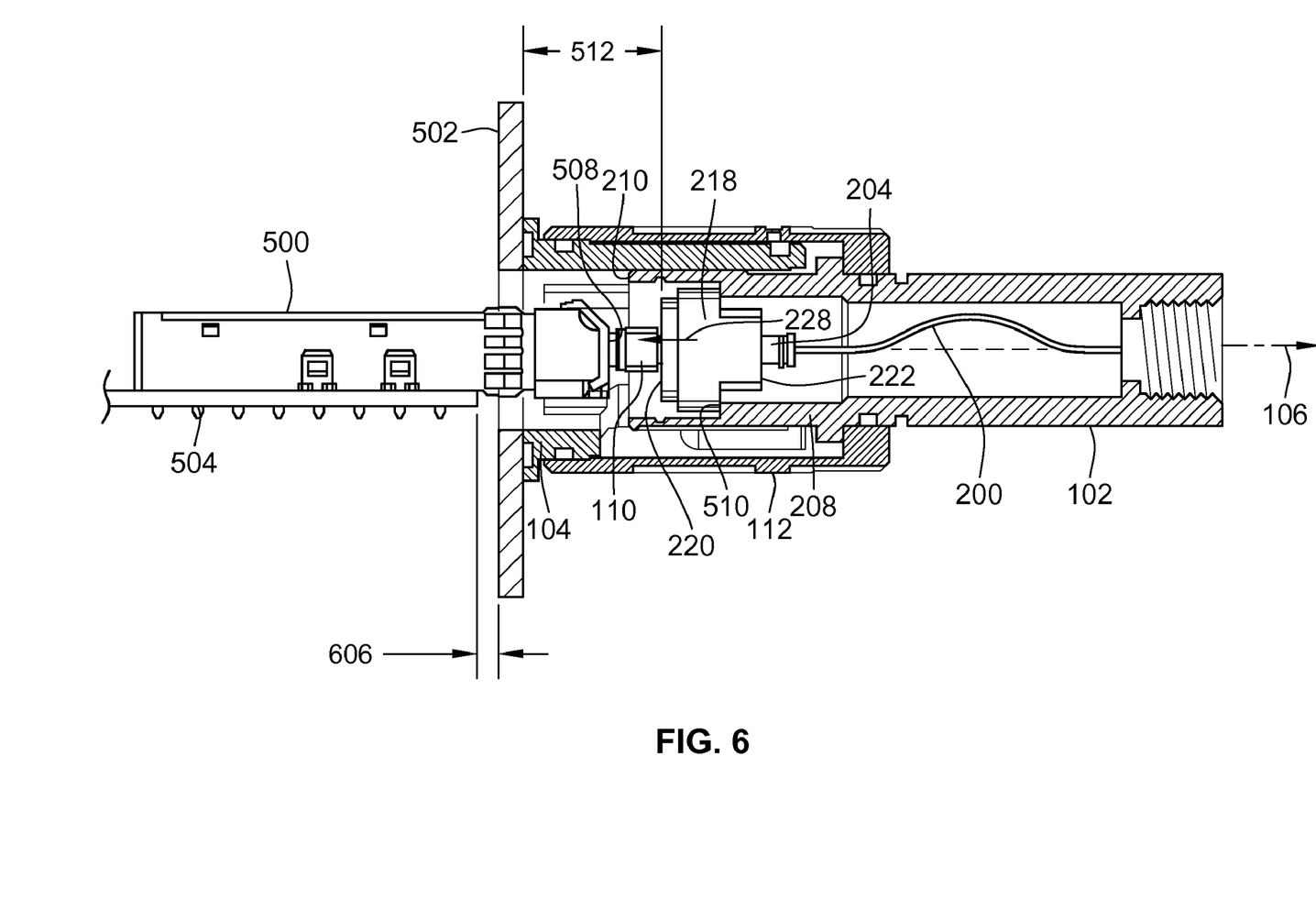
FIG. 6 is another partial cross-sectional view of the fiber optic connector assembly and the mating connector assembly in accordance with one embodiment.

FIG. 5 is a partial cross-sectional view of the fiber optic connector assembly 102 and the mating connector assembly 104 in a mated relationship in accordance with one embodiment. FIG. 6 is another partial cross-sectional view of the fiber optic connector assembly 102 and the mating connector assembly 104 in a mated relationship in accordance with one embodiment. FIGS. 5 and 6 illustrate the ability of the optical fiber connectors 110 to axially float along the center axis 106 in order to compensate for various positions of the optical communication device 500 of the mating connector assembly 104 relative to the panel 502. As shown in FIGS. 5 and 6, the mating connector assembly 104 is mounted to the panel 502 and the optical communication device 500 is mounted to a substrate 504, such as a circuit board. The panel 502 and substrate 504 are separated by a separation dimension that may vary among devices that include the panel 502 and the mating connector assembly 104. For example, in FIG. 5, the substrate 504 is separated from the panel 502 by a separation dimension 506. In FIG. 6, the substrate 504 is separated from the panel 502 by a smaller separation dimension 606. The separation dimension 506, 606 may determine the location of the optical communication device 500 relative to the panel 502 and the mating connector assembly 104. Additionally, the location of the optical communication device 500 on the substrate 504 may determine the location of the optical communication device 500 relative to the panel 502 and the mating connector assembly 104.

As shown in FIGS. 5 and 6, the connector base 218 is secured to the mating end 210 of the connector housing 208. The connector housing 208 includes internal ledges 510 that engage the connector base 218 and prevent the connector base 218 from moving along the center axis 106 and away from the mating connector assembly 104 past the internal, ledges 510 when the connector housing 208 is received in the mating; connector assembly 104. A separation dimension 512 extends along the center axis 106 between the forward end 220 of the connector base 218 and the exterior surface of the panel 502 when the fiber optic connector assembly 102 and mating connector assembly 104 are mated. As shown in FIGS. 5 and 6, the separation dimension 512 may remain approximately constant regardless of the position of the optical communication device 500 with respect to the panel 502.

As the location of the optical communication device 500 relative to the panel 502 and the mating connector assembly 104, may vary among, different devices, the location of the mating surface 508 of the optical communication device 500 also may vary relative to the panel 502 and the mating connector assembly 104. For example, the mating surface 508 extends farther away from the panel 502 in the mating connector assembly 104 in the embodiment shown in FIG. 6 than in the embodiment shown in FIG. 5. When the fiber optic connector assembly 102 mates with the mating connector assembly 104, the coupling interface component 112 of the fiber optic connector assembly 102 engages the mating connector assembly 104. This engagement may advance the optical fiber connectors 110 toward the mating surface 508 of the optical communication device 500 by the coupling distance 122 (shown in FIG. 1) along the center axis 106. As the separation dimension 512 between the connector base 218 and the panel 502 may remain approximately the same but the location of the mating surface 508 may vary, the engagement between the coupling interface component 112 and the mating connector assembly 104 may move the optical fiber connectors 110 too far toward the mating surface 508 and compress the outer ends 202 (shown in FIG. 2) against the mating surface 508. Overdriving the optical fiber connectors 110 in such a manner may result in damage to the optical fibers 200.

In order to prevent damage to the outer ends 202, the optical fiber connectors 110 axially float relative to the connector housing 208. As described above, the posts 204 slide within the connector base 218 and along the center axis 106, thereby permitting the optical fiber connectors 110 to move along the center axis 106. The optical fiber connectors 110 are able to retreat away from the mating surface 508 when the mating surface 508 extends farther into the mating connector assembly 104 away from the panel 502. For example, as shown in FIG. 6, when the mating surface 508 is located in one mating connector assembly 104 in a position that is farther from the panel 502 than another mating connector assembly 104, the posts 204 slide along the center axis 106 and partially extend out of the rearward end 222 of the connector base 218. As the posts 204 slide within the connector base 218, the optical fiber connectors 110 move away from the panel 502. The optical fiber connectors 110 may slide away from the panel 502 by the floating distance 306. By way of example only, in one embodiment, the floating distance 306 is at least approximately 1.0 millimeter. Alternatively, the floating distance 306 is at least approximately 2.0 millimeters. Other floating distances 306 may be within the scope of one or more embodiments described herein.

The floating distance 306 provides increased dimensional tolerance in mating the outer ends 202 (shown in FIG. 2) of the optical fibers 200 with the mating surface 508. For example, instead of the location of the outer ends 202 being fixed relative to one or more other components of the fiber optic connector assembly 102, the ability of the optical fiber connectors 110 to float along the center axis 106 permits the outer ends 202 to engage the mating surface 508 over an increased range of separation dimensions 506, 606 between the substrate 504 and the panel 502 and/or over an increased range of positions of the optical communication device 500 relative to the panel 502

The optical fiber connectors 110 move along the center axis 106 relative to the connector housing 208 while the connector housing 208 remains in approximately the same position relative to the mating connector assembly 104 and the panel 502 in the illustrated embodiment. The optical fiber connectors 110 may axially float along the center axis 106 relative to one or more other components of the system 100 (shown in FIG. 1). For example, the optical fiber connectors 110 may move along the center axis 106 relative to the coupling interface component 112. As the optical fiber connectors 110 move away from the panel 502, the springs 224 are compressed between the connector base 218 and the optical fiber connectors 110 to impart a restoring force on the optical fiber connectors 110 in the mating direction 228. The restoring force ensures that the outer ends 202 (shown in FIG. 2) of the optical fibers 200 remain in contact with or otherwise engaged with the mating surface 508 of the optical communication device 500 to optically communicate signals therebetween.

Figure 7:
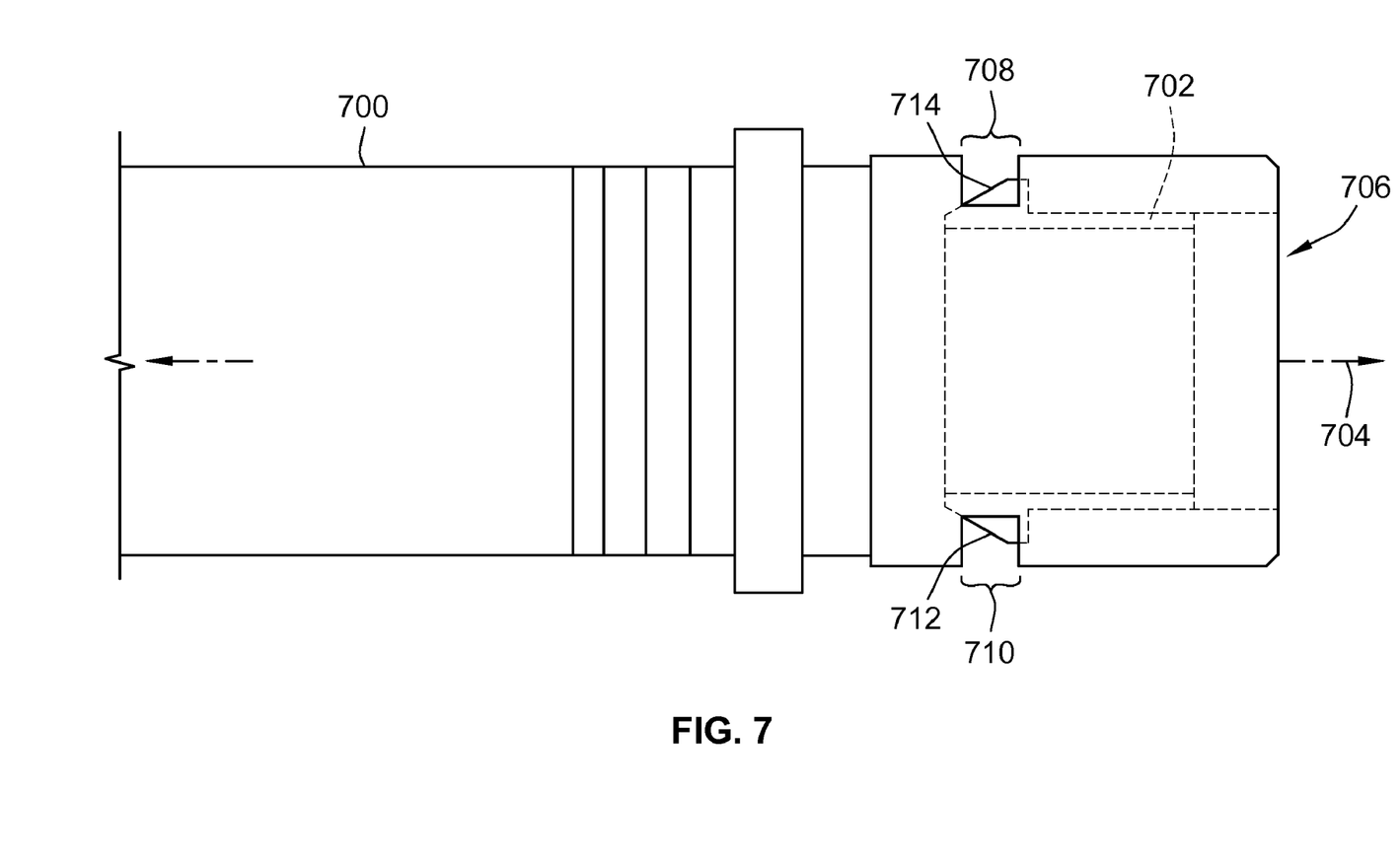
FIG. 7 illustrates a perspective view of a connector housing and a connector base in accordance with another embodiment.

FIG. 7 illustrates a perspective view of a connector housing 700 and a connector base 702 in accordance with another embodiment. The connector housing 700 is shown in phantom view to more clearly show the connector base 702 inside the connector housing 700. The connector housing 700 may be similar to the connector housing 208 (shown in FIG. 2) and the connector base 702 may be similar to the connector base 218 (shown in FIG. 2). For example, the connector housing 700 may be received, in the mating connector, assembly 104 (shown in FIG. 1) to mate the fiber optic connector assembly 102 (shown in FIG. 1) with the mating connector assembly 104. The connector base 218 may hold the posts 204 (shown in FIG. 2) of the optical fiber connectors 110 (shown in FIG. 1) to permit the optical fiber connectors 110 to axially move along a center axis 704.

The connector housing 700 is elongated along the center axis 704 and defines an interior passage 706 that is similar to the passage 214 (shown in FIG. 2). Slots 708, 710 are located on opposite sides of the connector housing 700 and extend into the passage 706. Alternatively, the slots 708, 710 may be located elsewhere on the connector housing 700. The connector base 702 includes latches 712, 714 that radially extend from opposite sides of the connector base 702. Alternatively, the latches 712, 714 may be located, elsewhere on the connector base 702. The latches 712, 714 are received in the slots 708, 710 to secure the connector base 702 to the connector housing 700. For example, the connector base 702 may be loaded into the passage 706 until the latches 712, 714 protrude into and are received, by the slots 708, 710. The engagement between the latches 712, 714 and the slots 708, 710 may prevent the connector base 702 from moving relative to the connector housing 700. For example, the latches 712, 714 may engage the slots 708, 710 to prevent the connector base 702 from axially moving along the center axis 704 and/or rotating relative to the connector housing 700.

It is to be understood that the above description is intended to be illustrative, and not restrictive. For example, the above-described embodiments (and/or aspects thereof) may be used in, combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A fiber optic connector assembly comprising:
a connector housing extending along a center axis from a mating end to a cable receiving end with a passage extending between the mating end and the cable receiving end, the mating end configured to mate with a mating connector;
a connector base disposed within the passage of the connector housing between the mating end and the cable receiving end, the connector base including a channel extending therethrough that is configured to receive an optical fiber; and
an optical fiber connector coupled to the optical fiber and configured to mate with the mating connector to optically couple the optical fiber with the mating connector, wherein the optical fiber connector axially moves along the center axis relative to the connector housing and within the channel of the connector base when the connector housing mates with the mating connector.

2. The connector assembly of claim 1, further comprising a coupling interface component coupled to the connector housing and configured to engage the mating connector to secure the connector housing to the mating connector, wherein the coupling interface component axially moves the optical fiber connector along the center axis by a coupling distance that is less than a floating distance that the optical fiber connector axially moves along the center axis relative to the connector housing.

3. The connector assembly of claim 1, wherein the optical fiber connector floats along the center axis relative to the connector housing while the connector housing remains in position relative to the mating connector.

4. The connector assembly of claim 1, further comprising a coupling interface component coupled to the connector housing, the coupling interface component securing the connector housing in a mated engagement with the mating connector by engaging the mating connector, wherein the optical fiber connector floats along the center axis relative to the coupling interface component and the connector housing when the coupling interface component engages the mating connector.

5. The connector assembly of claim 1, further comprising a spring disposed between the optical fiber connector and the connector base, wherein the spring is compressed between the connector base and the optical fiber connector when the optical fiber connector mates with the mating connector.

6. The connector assembly of claim 1, further comprising a spring disposed between the optical fiber connector and the connector base, wherein the spring imparts a restoring force on the optical fiber connector along the center axis and toward the mating connector when the connector housing is received in the mating connector.

7. The connector assembly of claim 1, wherein the connector housing includes an internal ledge that prevents the connector base from moving along the center axis away from the mating connector when the connector housing is received in the mating connector by abutting the connector base between the mating end and the cable receiving end of the connector housing.

8. The connector assembly of claim 1, wherein the optical fiber connector includes a rearwardly extending post oriented along the center axis, the post sliding through the channel of the connector base along the center axis when the optical fiber connector mates with the mating connector.

9. The connector assembly of claim 1, wherein the optical fiber connector floats along the center axis relative to the connector housing by at least approximately 1.0 millimeters.

10. The connector assembly of claim 1, wherein the optical fiber connector floats along the center axis relative to the connector housing by at least approximately 2.0 millimeters.

11. A fiber optic connector comprising:
 a connector housing extending along a center axis from a mating end to a cable receiving end with a passage extending therebetween, the mating end configured to be received in a mating connector;
 a connector base disposed between the mating end and the cable receiving end of the connector housing and including a channel extending therethrough for receiving an optical fiber;
 an optical fiber connector separate from the connector base and joined with the optical fiber, the optical fiber connector configured to mate with the mating connector; and
 a coupling interface component joined to the connector housing and configured to secure the connector housing to the mating connector, wherein the coupling interface component moves the optical fiber connector toward the mating connector and the optical fiber connector axially floats along the center axis relative to the coupling interface component with the optical fiber moving in the channel of the connector base when the coupling interface component engages the mating connector.

12. The connector assembly of claim 11, wherein the optical fiber connector axially floats along the center axis relative to the connector housing when the coupling interface component engages the mating connector.

13. The connector assembly of claim 11, wherein the coupling interface component moves the optical fiber connector toward the mating connector by a coupling distance and the optical fiber connector is capable of axially moving along the center axis relative to the coupling interface component by a floating distance when the coupling interface component engages the mating connector, the floating distance being larger than the coupling distance.

14. The connector assembly of claim 11, wherein the optical fiber connector is slidably coupled to the connector base to permit the optical fiber connector to axially move along the center axis relative to the connector housing when the connector housing mates with the mating connector.

15. The connector assembly of claim 11, wherein the optical fiber connector floats along the center axis relative to the connector housing while the connector housing remains in position relative to the mating connector.

16. The connector assembly of claim 11, further comprising a spring disposed between the optical fiber connector and the connector base, wherein the spring is compressed between the connector base and the optical fiber connector when the optical fiber connector mates with the mating connector.

17. The connector assembly of claim 11, wherein the connector housing includes an internal ledge that engages the connector base between the mating end and the cable receiving end of the connector housing to prevent the connector base from moving along the center axis away from the mating connector when the connector housing is received in the mating connector.

18. The connector assembly of claim 11, wherein the connector base includes an axial channel oriented along the center axis and the optical fiber connector includes a rearwardly extending post oriented along the center axis, the post sliding through the channel when the optical fiber connector mates with the mating connector.

19. The connector assembly of claim 11, wherein the optical fiber connector floats along the center axis relative to the connector housing by at least approximately 1.0 millimeters.

20. The connector assembly of claim 11, wherein the optical fiber connector floats along the center axis relative to the connector housing by at least approximately 2.0 millimeters.

* * * * *